United States Patent
Jeong

(10) Patent No.: US 6,171,185 B1
(45) Date of Patent: Jan. 9, 2001

(54) POWER SAVING OPERATIONAL CONTROL METHOD OF AIR CONDITIONER

(75) Inventor: Sang-jin Jeong, Suwon (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 09/325,347

(22) Filed: Jun. 4, 1999

(30) Foreign Application Priority Data

Nov. 27, 1998 (KR) .................................................. 98-51402

(51) Int. Cl.$^7$ ...................................................... F24F 7/007
(52) U.S. Cl. ............................................ 454/229; 237/2 A
(58) Field of Search .................................. 454/229, 258; 237/2 A; 236/49.3

(56) References Cited

U.S. PATENT DOCUMENTS

| | | | | |
|---|---|---|---|---|
| 5,299,430 | * | 4/1994 | Tsuchiyama | ............................ 62/180 |
| 5,833,134 | * | 11/1998 | Ho et al. | ............................ 236/49.3 |
| 5,947,371 | * | 9/1999 | Lee | ...................................... 237/49.3 |

* cited by examiner

Primary Examiner—Harold Joyce
Assistant Examiner—Derek S. Boles

(74) Attorney, Agent, or Firm—Robert E. Bushnell, Esq.

(57) ABSTRACT

A power saving operational control method of an air conditioner adapted to maintain a room space at a pleasant state regardless of a distance from an indoor unit and size of the room space, thereby increasing a power saving effect, the method comprising the steps of: turning on or turning off a compressor according to a comparative result between a set-up temperature input by a user and room temperature to maintain the room temperature at the set-up temperature; discriminating whether a power saving operation signal is input; swinging the vertical/horizontal vanes vertically and horizontally to adjust directions of discharged air to the entire area of the room when it is discriminated at the signal input discriminate step that the power saving operation signal is input; discriminating whether the compressor is rendered active when it is discriminated at the signal input discrimination step that the power saving operation signal is input; calculating a power saving set-up temperature according to the room temperature and set-up temperature at the time of the compressor being rendered active when it is discriminated at the compressor activation discriminating step that the compressor is rendered active; and turning on or turning off the compressor according to a comparative result between the power saving set-up temperature calculated at the power saving set-up temperature calculating step to thereby maintain the room temperature at a power saving set-up temperature.

19 Claims, 9 Drawing Sheets

| POWER SAVING SET-UP TEMPERATURE / TEMPERATURE CALCULATED FREQUENCY | Tg (COMPRESSOR-OFF TEMPERATURE) | Tg+a (COMPRESSOR-ON TEMPERATURE) |
|---|---|---|
| FIRST | 25°C | 26°C |
| SECOND | 25.4°C | 26.4°C |
| THIRD | 25.6°C | 26.6°C |
| FOURTH | 26.6°C | 26.6°C |

POWER SAVING OPERATIONAL CONTROL METHOD OF AIR CONDITIONER

CLAIM OF PRIORITY

This application makes reference to, incorporates the same herein, and claims all benefits accruing under 35 U.S.C. § 119 from an application for POWER SAVING OPERATIONAL CONTROL METHOD OF AIR CONDITIONER earlier filed in the Korean Industrial Property Office on Nov. 27, 1998 and there duly assigned Serial No. 51402/1998.

BACKGROUND OF THE INVENTION

1. Field of the Invention

The present invention relates to an air conditioner adapted to shorten an on-time of a compressor by establishing a higher power saving set-up temperature than a user set-up temperature during a normal operation to thereby perform a power saving operation, and more particularly to a power saving operational control method of an air conditioner adapted to control directions of air discharged during the power saving operation, thereby increasing a power saving effect of the air conditioner.

2. Description of the Related Art

Generally, an air conditioner is divided into various kinds according to its construction and function. The air conditioner can be divided into exclusive cooling, exclusive cooling and dehumidifying, and cooling and heating dual operations in view of function. The air conditioner can be also divided structurally into an integrated type installed at a window sill for integrating the cooling an heat-radiating functions and a separation type having a cooling apparatus indoors while installing a heat-radiating and compressing apparatus outdoors.

The separation type of air conditioner includes a multi-type which has one outdoor unit connected to more than two indoor units for air conditioning a plurality of indoor spaces.

FIG. 1 illustrates an indoor unit of a separation typed air conditioner for dual function of cooling and heating operations. As shown in FIG. 1, the air condition includes an indoor unit 1, a suction inlet 3, and an outlet 5. The outlet 5 further includes a remote controlled signal receiver 7 for receiving a remote-controlled signal transmitted from a remote controller 9 (hereinafter referred to a remocon) and vertical vanes 11 for vertically controlling directions of air and horizontal vanes 13 for horizontally controlling directions of the air. Meanwhile, the remocon 9 is mounted with a plurality of operation mode keys for inputting operation/stop of the air conditioner, operation selection (automatic, cooling dehumidifying, blowing, heating, power-saving and the like), air amount selection (high wind, intermediate wind, low wind and the like), turbo, mild, temperature adjustment and the like, and a plurality of timer mode keys for inputting present time, handy reservation, start/completion and the like.

FIG. 2 is a side sectional view for illustrating an indoor unit installed on a wall surface, where like reference numerals are used for designation of like or equivalent parts or portions and redundant references will be omitted.

As shown in FIG. 2, the indoor unit 1 is provided therein with an indoor heat exchanger 15 disposed at the rear of the suction inlet 3 for heat-exchanging room air sucked through the suction inlet 3 into cooling air or heating air, an indoor fan 17 disposed at the rear of the indoor heat exchanger 15 for discharging indoors the air heat-exchanged by the indoor heat exchanger 15, and a duct member 19 for guiding the flow of air sucked through the suction inlet 3 and discharged to the outlet 5. Unexplained reference numeral 21 is an evaporative water dish.

In an inverter type air conditioner used for dual purpose of cooling and heating operations thus structured, refrigerant flows through a refrigerant cycle during a heating operation which is formed by, as illustrated in FIG. 3 is dotted arrow, a compressor 30→four-way valve→31→indoor heat exchanger 15→capillary tube 50→outdoor heat exchanger 40→four-way valve 31→compressor 30, while the four-way valve 31 is turned on.

Meanwhile, during a cooling operation, the four-way valve 31 is rendered inactive and the refrigerant flows through a refrigerant cycle which is formed by, as illustrated in FIG. 3 is solid arrow, the compressor 30→four-way valve 31→outdoor heat exchanger 40→capillary tube 50→indoor heat exchanger 15→four-way valve 31→compressor 30.

In the air conditioner for executing the dual purpose of heating and cooling operations by forming the refrigerant cycle thus described, when a user manipulates the remocon 9 and presses an operation/stop key (hereinafter called as operation key) to input a desired operation mode (by way of example, cooling), a set-up temperature Ts and a set-up air amount, a remote control signal corresponding the key input is coded by a predetermined protocol, where the coded signal is modulated to be transmitted in an ultrared signal.

When the ultrared signal is transmitted from the remocon 9, the signal is received by the remocon signal receiver 7 to thereafter be converted to an electric signal. The converted electric signal is demodulated to start the operation of the indoor unit 1. At this moment, the indoor fan 17 is rotated according to set-up air amount and room air is sucked into the indoor unit 1 through the suction inlet 3.

Successively, when the temperature of room air sucked through the suction inlet 3 is detected by a temperature sensor (not shown) in the indoor unit 1, the indoor unit 1 compares room temperature Tr with the set-up temperature Ts transmitted from the remocon 9, and if the room temperature Tr is higher than the set-up temperature Ts, the compressor 30 is turned on, as illustrated in FIG. 4.

When the compressor 30 is rendered active, a refrigerant loop is formed in a slid arrow as illustrated in FIG. 3. In other words, when gaseous refrigerant of high pressure and high temperature discharged from the compressor 30 at the outdoor unit is infused into the outdoor heat exchanger 40 via the four-way valve 31, the outdoor heat exchanger 40 heat-exchanges the gaseous refrigerant compressed in high temperature and high pressure to air blown by an outdoor fan 41, forcibly cool and condense same, where liquefied refrigerant of low pressure and low temperature condensed by the outdoor heat exchanger 40 is infused into the capillary tube 50.

The liquefied refrigerant of low pressure and low temperature infused into the capillary tube 50 is expanded to frostless refrigerant of evaporable low pressure and low temperature and infused into the indoor heat exchanger 15 at the indoor unit 1.

The indoor heat exchanger 15 takes away heat from the air blown by the indoor fan 17 to thereby cool the room air when the frostless refrigerant of low pressure and low temperature reduced in pressure by the capillary tube 50 passes via a plurality of pipes to be evaporated and to be gasified.

The cool air heat-exchanged by the indoor heat exchanger 15 is adjusted horizontally and vertically in directions thereof by angles of the vertical vanes 11 and horizontal vanes 13 to perform the cooling operation, whereby, the gaseous refrigerant of low pressure and low temperature cooled by the indoor heat exchanger 15 is again infused into the compressor 30 via the four-way valve 31 and is changed to refrigerant gas of high pressure and high temperature by adiabatic compressing action of the compressor 30 to thereafter repeat the refrigerant cycle thus described.

When the cooling operation thus described is executed for a predetermined time, room temperature is gradually lowered and the room temperature Tr being changed is measured, where, the compressor 30 is turned off when the room temperature Tr reaches the set-up temperature Ts, as illustrated in FIG. 4.

When the compressor 30 is rendered inactive and the room temperature Tr is gradually increased to reach the set-up temperature plus (+) 1, the compressor 30 is again turned on, as illustrated in FIG. 4, to repeat an operation of decreasing the room temperature Tr to the set-up temperature Tr and a normal operation of maintaining the room temperature Tr at the set-up temperature Ts, as illustrated in a normal operation region of FIG. 4.

When the user selects a power-saving operation when the normal operation thus described is under way, a power-saving, set-up temperature Tm is established higher than the set-up temperature Ts of normal operation and the compressor 30 is made to turn on as illustrated in FIG. 4 when the room temperature Tr is higher than the set-up temperature Tm of power-saving operation.

The room temperature Tr is gradually decreased according to activation of the compressor 30 and when the room temperature Tr reaches the power-saving set-up temperature Tm, the compressor 30 is made to turn off, as illustrated in FIG. 4.

Successively, when the room temperature Tris gradually increased according to deactivation of the compressor 30 to approach the power-saving set-up temperature Tm plus (+) 1, the 8 compressor 30 is again rendered active to repeat a decreasing process of the room temperature Tr to the power-saving set-up temperature Tm, whereby, as illustrated in power-saving operation region in FIG. 4, the room temperature Tr is maintained at the power-waving set-up temperature Tm to perform a power-saving operation of shortening an activated time of the compressor 30.

However, there is a problem in the conventional power-saving operation method thus descried in that it is difficult to embody a pleasant operation because a user does not feel a pleasant temperature as the user is positioned distanced from the indoor unit 1, and Predicted Percentage of Dissatisfied (PPD) index which expresses as constant a pleasantness felt by the user is increased to make the user feel quite unpleasant, as illustrated in FIG. 10, because power-saving effect differs according to the size of room space, although there is an advantage of power-saving operation around the ambient area of the indoor unit 1, where, zone of the set-up temperature Ts established by the user is not considered to calculate the power-saving set-up temperature Tm at a constant level and vertical/horizontal vanes 11 and 13 are fixed to execute the power-saving operation.

SUMMARY OF THE INVENTION

The present invention is disclosed to solve the aforementioned problems and it is an object of the present invention to provide a power saving operational control method of an air conditioner adapted to establish a power-saving set-up temperature close to a pleasant temperature according to a users set-up temperature and simultaneously to control operation of vanes for adjusting directions of discharged air to maintain a room space in a pleasant state regardless of distance from the indoor unit and size of the room space, thereby increasing a power-saving effect.

In accordance with the object of the present invention, there is provided a power saving operational control method of an air conditioner mounted with vertical/horizontal vanes for vertically and horizontally adjusting directions of the discharged air, the method comprising the steps of:

turning on or turning off a compressor according to a comparative result between a set-up temperature input by a user and room temperature to maintain the room temperature at the set-up temperature;

discriminating whether a power saving operation signal is input;

swinging the vertical/horizontal vanes vertically and horizontally to adjust directions of discharged air to the entire area of the room when it is discriminated at the signal input discriminate step that the power saving operation signal is input;

discriminating whether the compressor is rendered active when it is discriminated at the signal input discrimination step that the power saving operation signal is input;

calculating a power saving set-up temperature according to the room temperature and set-up temperature at the time of the compressor being rendered active when it is discriminated at the compressor activation discriminating step that the compressor is rendered active; and turning on or turning off the compressor according to a comparative result between the power saving set-up temperature calculated at the power saving set-up temperature calculating step to thereby maintain the room temperature at a power saving set-up temperature.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will now be described in detail with reference to the accompanying drawings.

Figure 1:
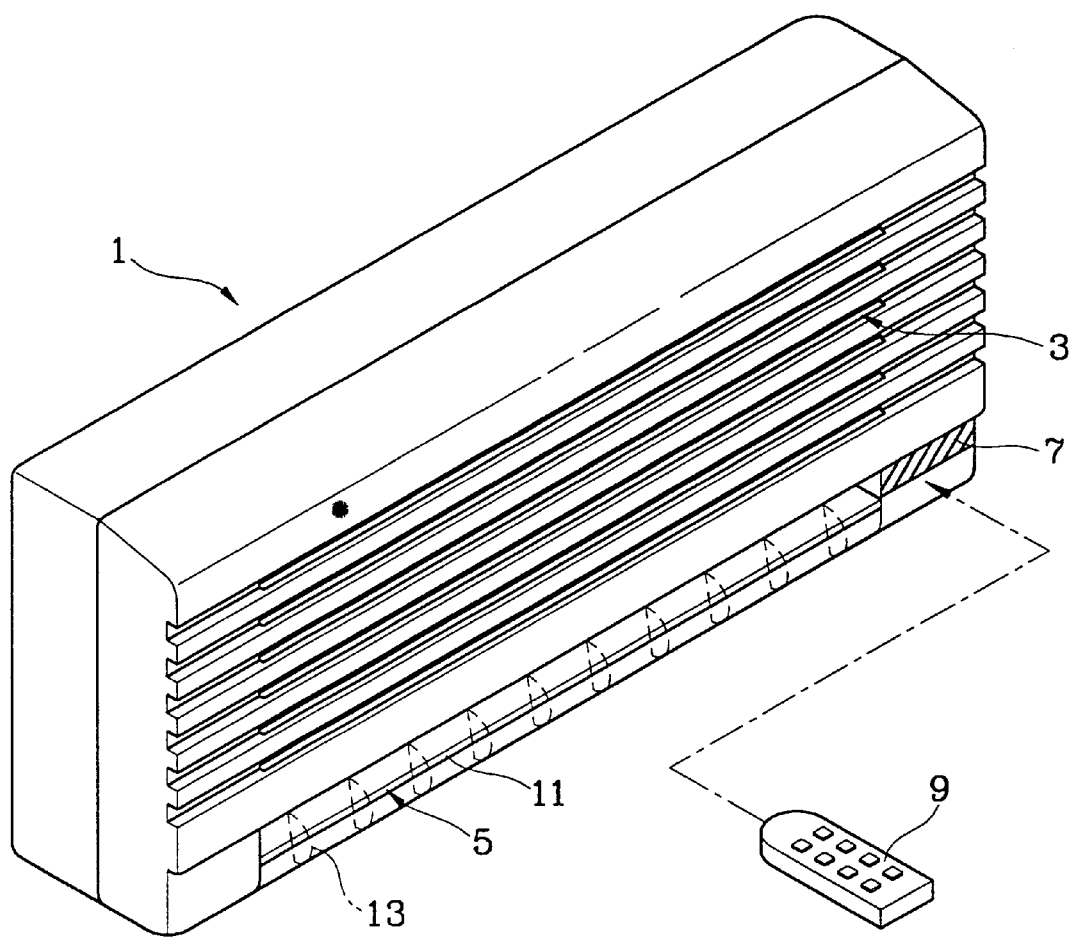
FIG. 1 is a perspective view for illustrating an indoor unit of a conventional air conditioner.
Figure 2:
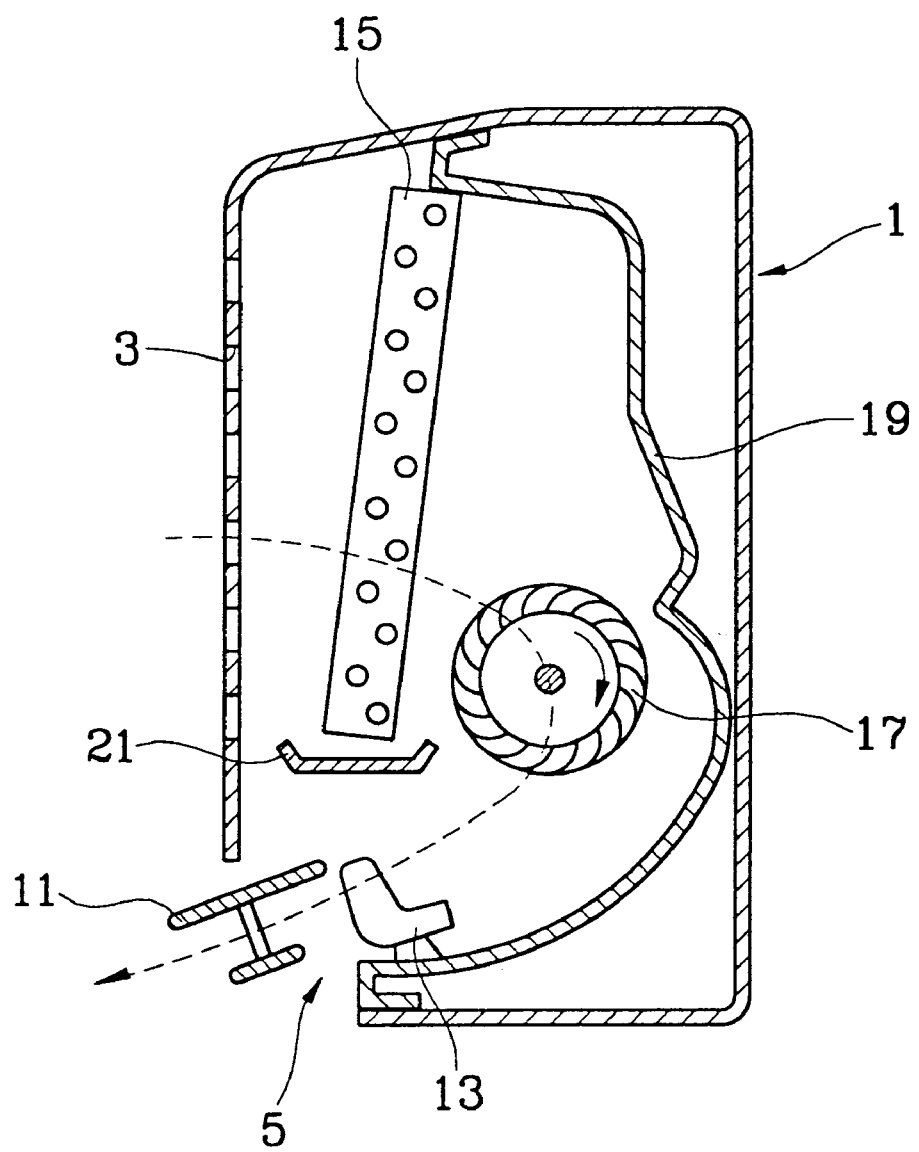
FIG. 2 is a side sectional view for illustrating an indoor unit of FIG. 1 installed on a wall surface.
Figure 3:
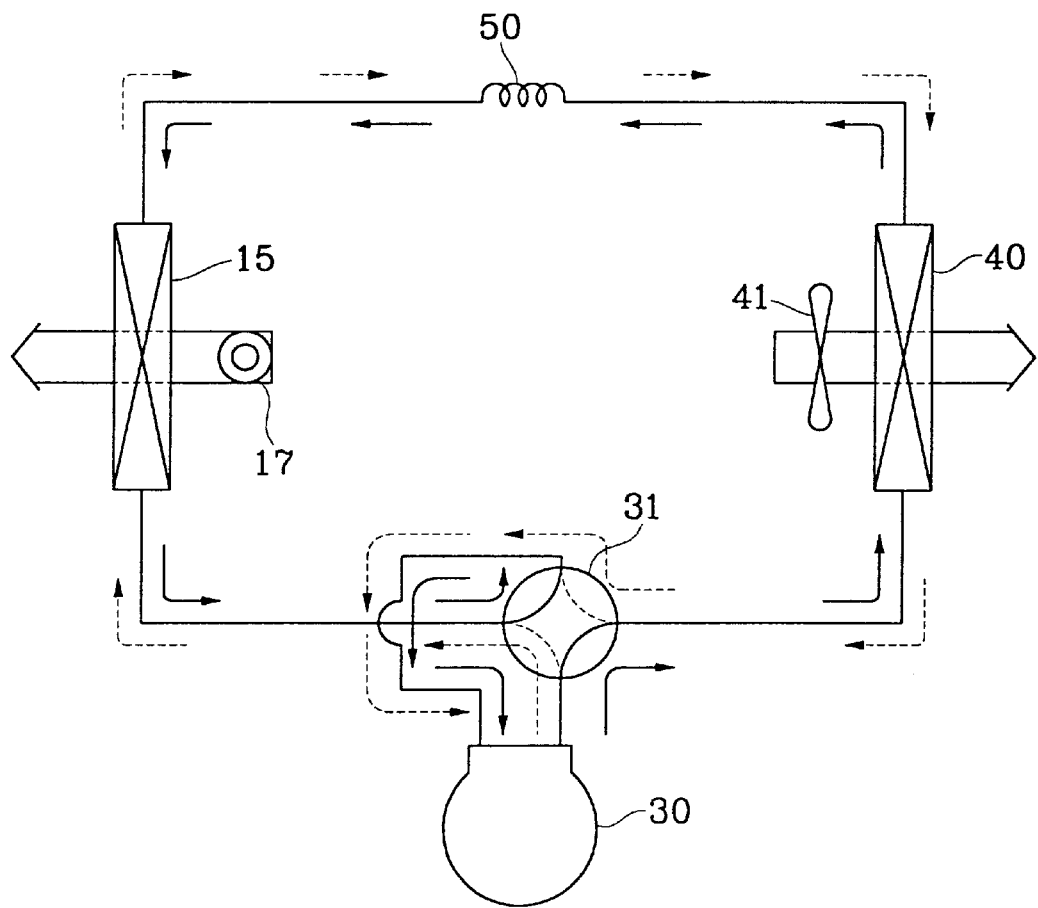
FIG. 3 is a diagram of a refrigerant cycle in a conventional air conditioner.
Figure 4:
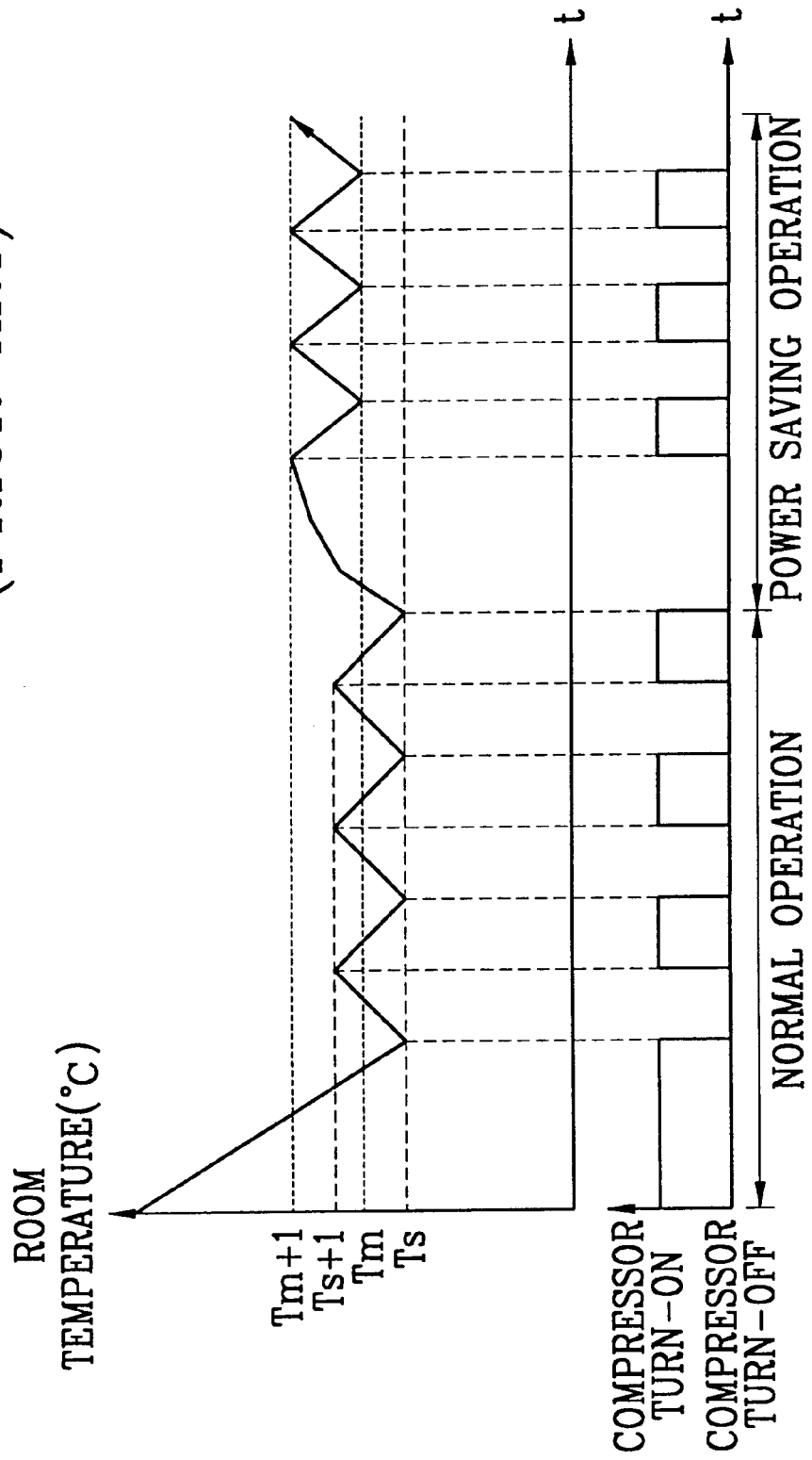
FIG. 4 is a schematic diagram for illustrating an operational state of a compressor according to a comparison between a room temperature and a set-up temperature in a conventional air conditioner.

An air conditioner according to the present invention is identical in its structure to that of FIGS. 1, 2 and 3, such that, like reference numerals are used for designation of like or equivalent parts or portions and redundant references will be omitted.

Figure 5:
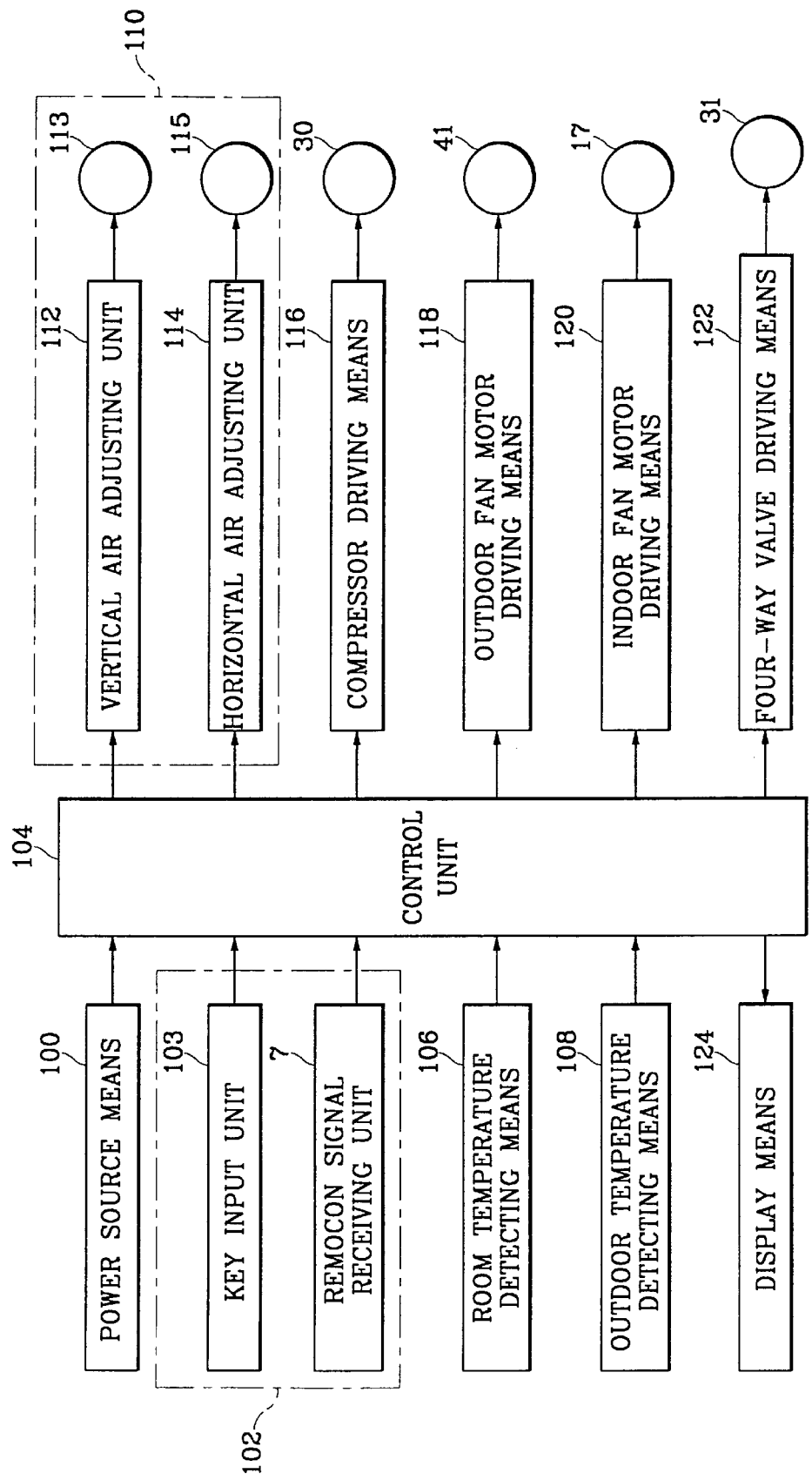
FIG. 5 is a control block diagram of a power saving control apparatus in an air conditioner according to one embodiment of the present invention.

As illustrated in FIG. 5, power source means 100 converts a commercial AC voltage supplied from an AC power terminal (not shown) to a predetermined DC voltage necessary for operation of the air conditioner to output same, and operation manipulating means 102 is disposed with a plurality of functional key for inputting operation modes of the air conditioner (automatic, cooling, dehumidifying, blowing, heating and the like), set-up air amount, set-up air direction and set-up temperature Ts, an operation key for inputting an operation/stop of the air conditioner and a power saving operation key for inputting power saving operation/power saving operation stop, where the operation manipulating means 102 is mounted with a key input unit 103 provided on a control panel of the indoor unit 1, and a remocon signal receiving unit 7 for receiving an ultrared signal transmitted from the remocon 9 according to a key manipulation of the remocon 9.

Control means 104 is a microcomputer for receiving the DC voltage output from the power source means 100 to initialize the air conditioner and for controlling the entire operation of the air conditioner according to an operation selecting signal input by the operation manipulating means 102, where the control means 104 also calculates a power saving set-up temperature Tg according to power saving method during power saving operation and control air direction angles of vertical/horizontal vanes 11 and 13.

Room temperature detecting means 106 controls the room temperature by the temperature Ts set up by a user according to the operation manipulating means 102 such that room temperature Tr sucked into the indoor unit 1 is detected to execute the cooling and power saving operations of the air conditioner, and the outdoor temperature detecting means 108 detects an outdoor temperature which changes in the course of operation of the air conditioner to output same to the control means 104.

Furthermore, air direction adjusting means 10 vertically and horizontally adjusts directions of discharged air in order to make the air discharged through the discharge outlet according to activation of the power saving operation key dispersed to the entire area of the room, where the air direction adjusting means 110 includes a vertical air adjusting unit 112 for receiving a pulse signal output from the control means 104 to drive a vertical stepping motor 113 for moving the vertical vanes 11 and a horizontal air adjusting unit 114 for receiving a pulse signal output from the control means 104 to chive a horizontal stepping, motor 115 for moving the horizontal vanes 13.

Compressor driving means 116 receives a control signal output from the control means 104 according to a comparative result between the temperature Ts set up by a user according to operation of the operation manipulating means and room temperature Tr detected by the room temperature detecting means 106, to activate and deactivate the compressor 30 and simultaneously controls the compressor 30 according to the power saving set-up temperature Tg calculated by the control means 104.

Outdoor fan motor driving means 118 receives a control signal output from the control means 104 according to a comparative result between the temperature Ts set up by a user according to operation of the operation manipulating means 10 and the room temperature Tr detected by the room temperature detecting means 106, to control revolution of an outdoor fan motor such that the air heat-exchanged by the outdoor heat exchanger 40 can be blown outdoors, and to controllably drive the outdoor fan 41.

Indoor fan motor driving means 120 receives a control signal output from the control means 104 according to air amount established by a user responsive to operation of the operation manipulating means to control revolution of an indoor fan motor for flowing indoors the air (cool air or hot air) heat-exchanged and to controllably drive the indoor fan 17.

Four-way valve driving means 122 receives a control signal output from the control means 104 in order to change the flow the refrigerant according to operation condition (cooling or heating) input by the operation manipulating means 102 and to activate/deactivate the four-way valve 31.

Display means 124 in the drawing indicates operation selection modes (automatic, cooling, dehumidifying, flowing, heating, power-saving and the like) input by the operation manipulating means 102 according to control of the control means 104 and also displays an operation state of the air conditioner.

Hereinafter, operational effect of the power saving operation control method of an air conditioner thus constructed will be described.

Figure 6:
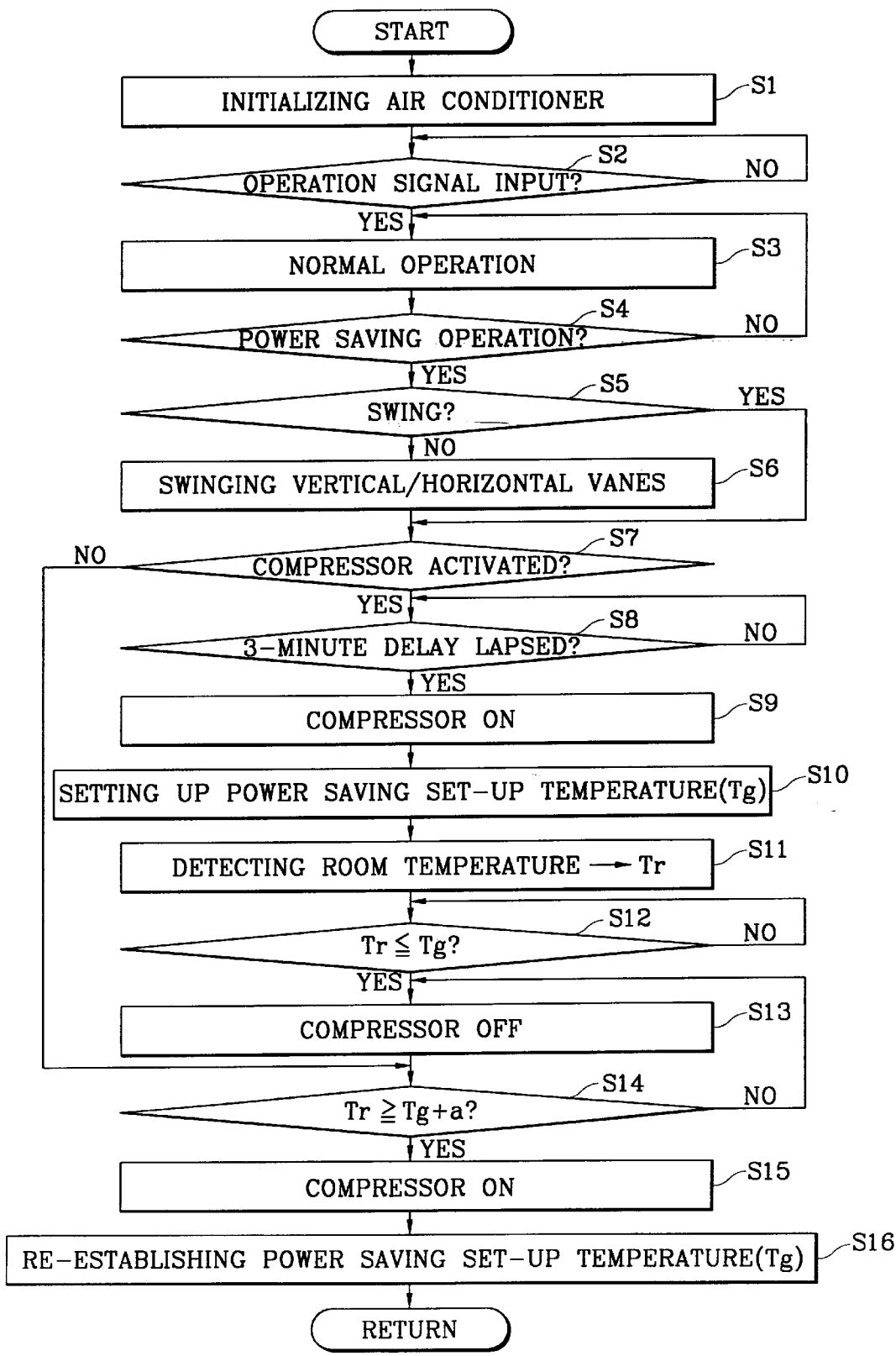
FIG. 6 is a flow chart for illustrating a power saving control operational procedure of an air conditioner according to the present invention.

FIG. 6 is a flow chart for illustrating a control operation procedure of power saving operation in an air conditioner according to the present invention, where S defines step.

First of all, when a power is applied to the air conditioner, the power source means 100 converts to a predetermined DC voltage necessary for driving the air conditioner a commercial AC voltage supplied from an AC power terminal (not shown) to output same to each driving circuit and control means 104.

At step S1, the control means 104 receives the DC voltage output from the power source means 100 to initialize the air conditioner. At this time, when a user manipulates the operation manipulating means 102 and presses an operation key to input an operation mode (by way of example, cooling), set-up temperature Ts and set-up air amount of the air conditioner, an operation start signal (hereinafter referred to an operation signal) and an operation selection signal are input to the control means 104 from the operation manipulating means 102.

Successively, at step S2, the control means discriminates whether an operation signal is input from the operation manipulating means 102, and if the operation signal is not input (in case of NO), the control means 102 maintains the air conditioner at operation stand-by state and repeats operations subsequent to step S2.

Figures 7, 8:
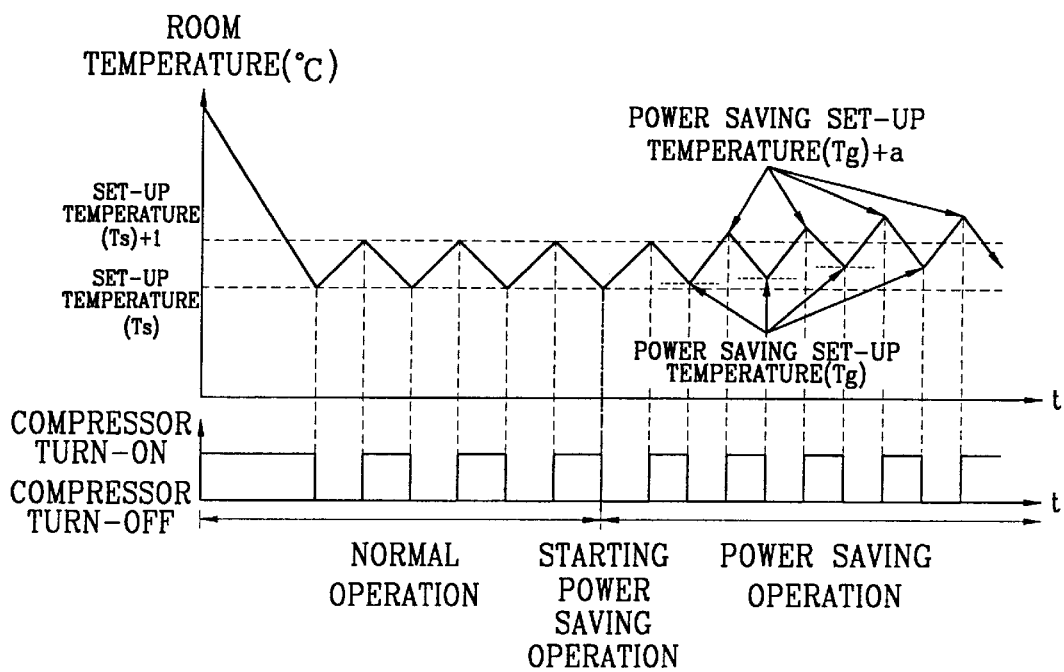
FIG. 7 is a schematic diagram for illustrating an operational state of a compressor according to a comparison between a room temperature and a set-up temperature according to the present invention.
FIG. 8 is a graph for illustrating a power saving set-up temperature change according to the present invention.

As a result of discrimination at step S2, if the operation signal is input (in case of YES), flow proceeds to step S3, where the control means 104 controls the room temperature according to the set-up temperature Ts to put the air conditioner into a normal operation as illustrated in a normal operation region in FIG. 7.

In other words, a comparison is made at the control means 104 between the set-up temperature Ts and the room temperature Tr, and if the room temperature Tr is higher than the set-up temperature Ts, the control means outputs a control signal to the compressor driving means 110 in order to activate the compressor 30, where the compressor driving means 116 receives the control signal output from the control means 104 to turn on the compressor 30.

When the room temperature Tr reaches the set-up temperature Ts due to gradual decrease of the room temperature Tr according to activation of the compressor 30, the compressor driving means 116 receives the control signal output from the control means 104 to deactivate the compressor 30.

When the room temperature Tr is gradually increased due to deactivation of the compressor 30 to thereby reach the set-up temperature Ts plus (+) 1, the compressor driving means 116 receives the control signal output from the control means 104 to again turn on the compressor 30 and to repeat a process of decreasing the room temperature Tr to the set-up temperature Ts, where, as shown in the normal operation region in FIG. 7, a normal operation of maintaining the room temperature to the set-up temperature Ts is executed.

In the normal operation thus described, a discrimination is made at step S4 as to whether a power saving operation key at the operation manipulating means 102 is rendered active to receive a power saving operation signal at the control means 104 from the operation manipulating means 102, and if the power saving operation manipulating means 102, and if the power saving operation signal is not received (in case of NO), flow returns to step S3 to repeat operations subsequent to step S3.

As a result of the discrimination at step S4, if the power saving operation signal is received (in case of YES), flow proceeds to step S5, where the control means 104 discriminates whether the vertical and horizontal vanes 11 and 13 swing under the normal operation.

As a result of the discrimination at step S5, if the vanes 11 and 13 do not swing (in case of NO), flow advances to step S6, where the control means 104 outputs a driving 9 pulse to the vertical and horizontal air adjusting units 112 and 114 for swinging the vanes 11 and 13.

Successively, the vertical air adjusting unit 112 receives the driving pulse output from the control means 104 to drive the vertical stepping motor 113 and to thereafter swing the vertical vanes repeatedly, and the horizontal air adjusting unit 114 also receives the driving pulse output from the control means 104 to drive the horizontal stepping motor 115 and to thereafter swing the horizontal vanes 13 repeatedly, such that the air discharged through the discharge outlet 5 is adjusted in directions thereof to the entire room.

Successively, at step S7, the control means 104 discriminates whether the compressor 30 is rendered active, and if the compressor 30 is activated (in case of YES), flow proceeds to step S8, where the control means discriminates whether a 3-minute delay period for protecting the compressor 30 has lapsed. If the 3-minute delay period has not lapsed (in case of NO), operations subsequent to step S5 are repeatedly executed until the 3-minute delay period lapses.

As a result of the discrimination at step S8, if the 3-minute delay period has lapsed (in case of YES), flow advances to step S9, where the control means 104 outputs a control signal to the compressor driving means 116 in order to drive the compressor 30. The compressor driving means 116 receives the control signal output from the control means 104 to activate the compressor 30 as illustrated in the power saving operation region in FIG. 7.

When the compressor 30 is rendered active, the gaseous refrigerant of high pressure and high temperature output from the compressor 30 at the outdoor unit is infused into the outdoor heat exchanger 40, where the outdoor heat exchanger 40 heat-exchanges the gaseous refrigerant compressed to high pressure and high temperature by the outdoor heat exchanger 40 to the air blown by the outdoor fan 41 and to forcibly cool same for condensation. The liquefied refrigerant of low temperature and low pressure condensed by the outdoor heat exchanger 40 is now infused into the capillary tube 50.

The liquefied refrigerant of low pressure and low temperature infused into the capillary tube 50 is expanded to evaporable frostless refrigerant of low pressure and low temperature to thereafter be infused into the indoor heat exchanger 15 mounted in the indoor unit 1. The indoor heat exchanger 15 takes away heat from the air blown by the indoor fan when the refrigerant is evaporated to thereafter be gasified, thereby cool the room air.

The cooled air is discharged indoors to perform the cooling operation and the gaseous refrigerant of low pressure and low temperature cooled by the indoor heat exchanger 15 is again infused into the compressor 30 to be changed to refrigerant gas of high temperature and high pressure according to adiabatic compressing action of the compressor 30 and to repeatedly flow in a refrigerant cycle along the solid arrow in FIG. 3 for execution of cooling operation in the room.

Successively, at step S10, the control means 104 establishes a power saving set-up temperature Tg at the power saving operation by utilizing a below mentioned power saving operation control formula when the compressor 30 is activated.

Tg=Ts+(Tr Ts) 0.4 (power saving coefficient) (1), where, Tg: power saving set-up temperature, Ts: set-up temperature, Tr: room temperature when the compressor is activated and figures down to two places of decimals are rounded off.

Accordingly, in the power saving operation, the compressor 30 is controlled in activation and deactivation thereof by the power saving set-up temperature Tg reestablished higher than the set-up temperature Ts under the normal operation. When the power saving set-up temperature Tg is calculated, temperature Tr of the air sucked into the indoor unit 1 through the suction inlet 3 is detected by the room temperature detecting means 106, step S11.

Successively, at step S12, the control means 104 receives an analogue data of the room temperature detected by the room temperature detecting means 106 to convert same to a digital data, and compares the room temperature Tr with the power saving set-up temperature Tg. At this time, IS a discrimination is made as to whether the room temperature Tr is below the power saving set-up temperature Tg and if the room temperature Tr is not below the power saving set-up temperature Tg (in case of NO), operations subsequent to step S12 are repeatedly performed.

As a result of the discrimination at step S12, if the room temperature Tr is below the power saving set-up temperature Tg (in case of YES), flow proceeds to step S13, where the control means 104 outputs a control signal to the compressor driving means 116 in order to stop the compressor 30.

Successively, the compressor driving means 116 receives the control signal output from the control means 104 to turn off the compressor 30 as illustrated in the power saving operation region in FIG. 7.

When the operation under this state is continued, the room temperature Tr is gradually increased, such that, at step S14, a discrimination is made as to whether the room temperature Tr is above the power saving set-up temperature Tg plus (+) a (=1.0), and if the room temperature Tr is not above the power saving set-up temperature Tg plus (+) a (in case of NO), flow returns to step S13 to deactivate the compressor 30 and to execute repeated operations subsequent to step S13.

As a result of the discrimination at step S14, if the room temperature Tr is above the power saving set-up temperature Tg plus (+) a (in case of YES), flow advances to step S15, where the control means 104 controls the compressor driving means 116 to turn the compressor 30 again, as illustrated in power saving operation region in FIG. 7, and to perform a power saving operation for maintaining the room temperature Tr at the power saving set-up temperature Tg in the power saving operation.

Successively, at step S16, the control means 104 reestablishes the power saving set-up temperature at the power saving operation according to the above mentioned formula 1 when the compressor 30 is rendered active to thereafter return.

Meanwhile, as a result of the discrimination at step S5, if the vertical and horizontal vanes 11 and 13 swing (in case of YES), flow proceeds to step S7 to repeat operations subsequent to step S7. As a result of the discrimination at step S7, if the compressor 30 is not rendered active (in case of NO), flow advances to step S14 to discriminate whether the room temperature Tr is above the power saving set-up temperature Tg plus (+) a, and the room temperature Tr is above the power saving set-up temperature Tg plus (+) a, the compressor 30 is rendered active to reestablish the power saving set-up temperature Tg at the power saving operation to thereafter return, as illustrated in the power saving operation region in FIG. 7.

Figure 9:
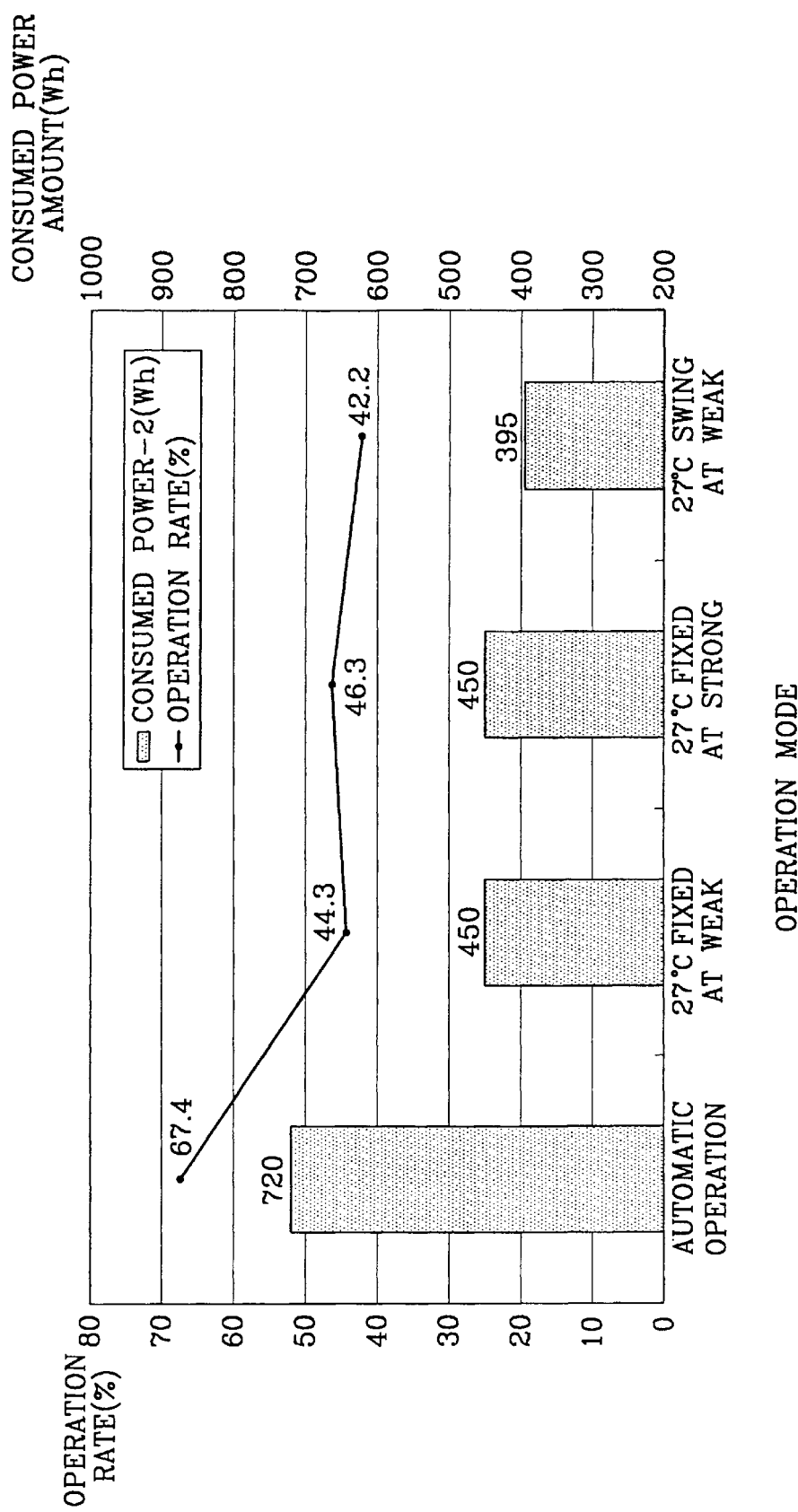
FIG. 9 is a graph for illustrating an operation rate and consumed power amount according to the present invention.
Figure 10:
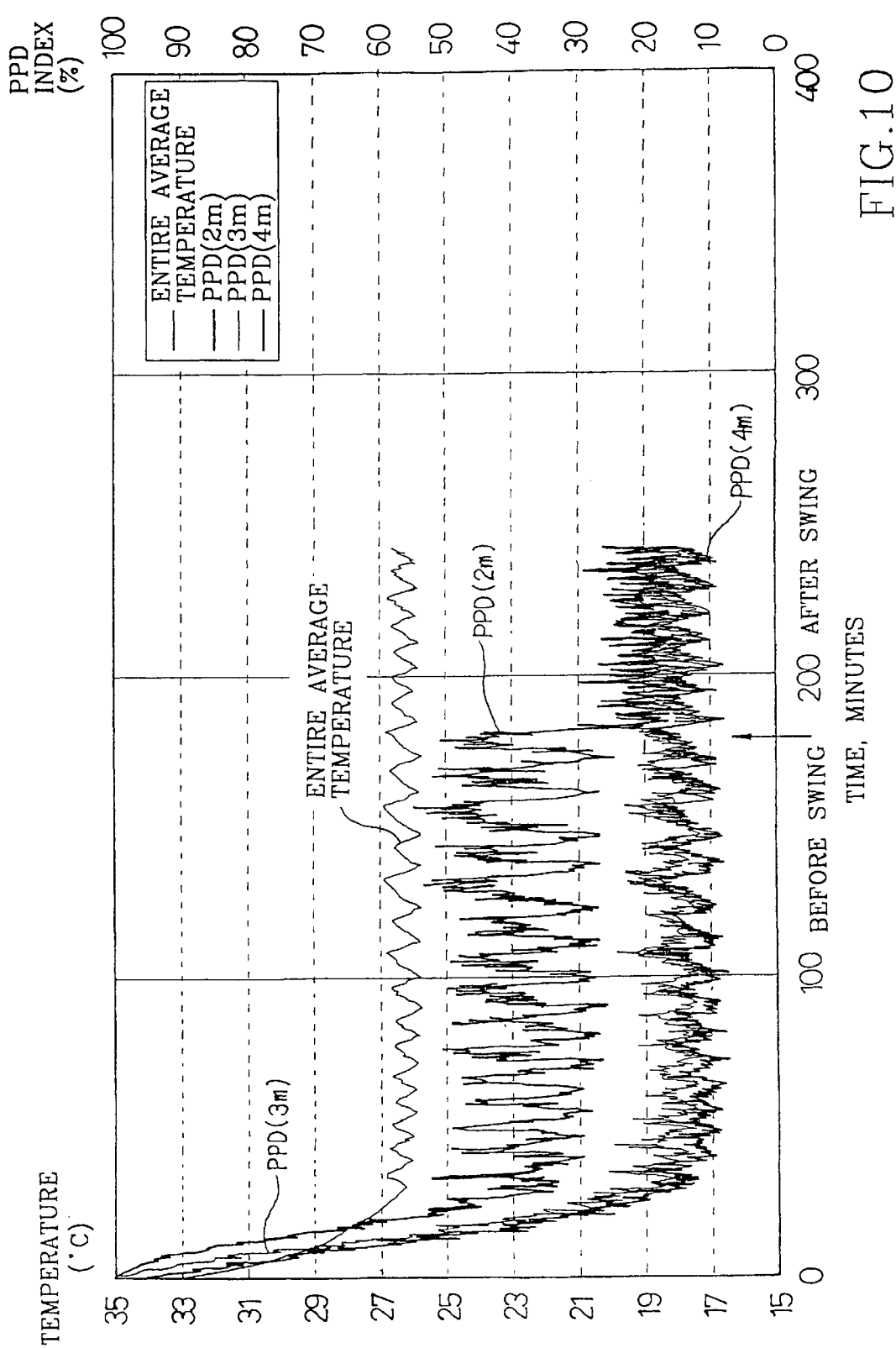
FIG. 10 is a graph for illustrating a PPD value change according to a distance in the present invention.

As illustrated in FIGS. 7 and 8 (power saving set-up temperature changes at a set-up temperature of 25 and a=1.0), the power saving set-up temperature Tg is gradually changed to reduce unpleasantness caused by sudden temperature change, and because the vertical and horizontal vanes 11 and 13 are swung, vertically and horizontally, compressor operation rate and consumed power amount are further reduced in comparison with the time when the vanes 11 and 13 are not swung, as illustrated in FIG. 9. Furthermore, PPD index is less expressed, as illustrated in FIG. 10, to thereby provide a user with a pleasant feeling regardless of a distance from the indoor unit 1 and size of the room space.

As apparent from the foregoing, there is an advantage in the power saving operational control method of an air conditioner according to the present invention in that a power saving set-up temperature is established close to a pleasant temperature according to a user s set-up temperature and motions of vanes for adjusting directions of the discharged air are controlled to maintain a room space at a pleasant state regardless of a distance from an indoor unit and size of the room space, thereby increasing a power saving effect.

What is claimed is:

1. In a method of operating an air conditioner which includes an air inlet, an air outlet, a heat exchanger, an air circulating fan, and an air direction regulating mechanism at the air outlet, the method comprising the steps of:

selecting between a normal operation for the air conditioner and a power saving operation for the air conditioner:

detecting a room temperature of room air within a room:

establishing a normal setup temperature in response to a selection of said normal operation;

establishing a power saving setup temperature in response to a selection of said power saving operation:

conducting said room air across the heat exchanger to change the temperature of the room air in accordance with a difference between the room temperature detected and said power saving setup temperature; and discharging the room air back into the room through the air outlet until the room temperature detected corresponds substantially to the power saving setup temperature;

the improvement comprising:

establishing a plurality of different intermediate temperatures over a range extending between said normal setup temperature and said power saving setup temperature in response to the selection of said power saving operation, said intermediate temperatures each differing by incremental amounts; and conducting said room air across the heat exchanger to change the temperature of the room air in accordance with differences between the room temperature detected and each one of said power saving setup temperatures during said power saving operation.

2. The method of claim 1, further comprising the step of adjusting directions of discharged air into the room in response to the selection of the power saving operation by varying orientation of the air direction regulating mechanism vertically and horizontally.

3. The method of claim 1, further comprising the step of establishing successive ones of said intermediate temperatures to differ by a predetermined equal increment of said range.

4. The method of claim 1, further comprising the step of establishing said intermediate temperatures calculated from a formula:

$$Tg=Tns+(Tr-Tns)*C.$$

wherein Tg is one of intermediate temperatures Tns is a normal setup temperature, Tr is a room temperature, and C is a power saving coefficient.

5. The method of claim 4, further comprising the steps of:

conducting room air across the heat exchanger to change the temperature of the room air upon detection of a first difference between the room temperature detected and said first intermediate temperature: and subsequently conducting room air across the heat exchanger to change the temperature of the room air upon detection of a second difference between the room temperature detected and said second intermediate temperature.

6. In an operation control apparatus of an air conditioner comprising:

an inlet admitting air from a room;

a heat exchanger selectively heating and cooling the air admitted;

an air outlet discharging the air admitted;

a fan sequentially circulating air through the inlet, the heat exchanger and the outlet;

an adjustable direction regulating mechanism vertically and horizontally adjusting direction of air discharged to the entire area of the room in response to a selection of a power saving operation;

an input device enabling a user to select between a plurality of modes of operation of the air conditioner and to select a set room temperature: and a control mechanism regulating operation of the heat exchanger the fan, the input device, and the air direction regulating mechanism;

the improvement comprising:

said input device enabling said user to select from among said plurality of modes a power saving operation and a normal operation and selecting a normal setup temperature for said normal operation and a power saving setup temperature for said power saving operation; and said control mechanism responding to a selection of the power saving operation, by establishing a plurality of intermediate temperatures ranged from said normal setup temperature to said power saving setup temperature and the room temperature by sequentially resetting said room temperature to incrementally different ones of said intermediate temperatures.

7. The apparatus of claim 6, further comprised of said adjustable direction regulating mechanism regulating a direction of air discharged from the outlet during said power saving operation.

8. The method of claim 6, further comprising the step of establishing said intermediate temperatures calculated from a formula:

$$Tg=Tns+(Tr-Tns)*C,$$

wherein Tg is one of intermediate temperatures. Tns is a normal setup temperature Tr is a room temperature and C is a power saving coefficient.

9. The apparatus of claim 6, with said control mechanism establishing each one of said intermediate temperatures to be arranged by a predetermined equal increment between said normal setup temperature and said power saving setup temperature.

10. The apparatus of claim 6, with said control mechanism establishing a first intermediate temperature and a second intermediate temperature ranged from said normal setup temperature to said power saving setup temperature, said first temperature being close to said normal setup temperature while said second temperature is close to said power saving setup temperature.

11. The apparatus of claim 10, with said control mechanism resetting the room temperature to said first intermediate temperature and further resetting the room temperature to said second intermediate temperature after said control mechanism has reset the room temperature to said first intermediate temperature.

12. A method of performing a normal operation and a power saving operation in an air conditioner, comprising the steps of:

detecting a room temperature:

establishing a normal setup temperature for a normal operation and a power saving setup temperature for a power saving operation, said normal setup temperature being different from said power saving setup temperature;

making a first determination of whether said room temperature equals said normal setup temperature when said normal operation is selected;

performing said normal operation in response to said first determination;

establishing a plurality of intermediate temperatures ranging between said normal setup temperature and said power saving setup temperature;

making a second determination of whether said room temperature equals one of said intermediate temperatures when said power saving operation is selected;

performing said power saving operation in response to said second determination;

making a third determination of whether said room temperature equals said power saving setup temperature after said power saving operation has been performed in response to said second determination; and performing said power saving operation in response to said third determination.

13. The method of claim 12, further comprising the step of establishing each of said intermediate temperatures to be arranged by a predetermined equal increment between said normal setup temperature and said power saving setup temperature.

14. The method of claim 12, further comprising the step of establishing a first intermediate temperature and a second intermediate temperature ranged from said normal setup temperature to said power saving setup temperature said first temperature being close to said normal setup temperature while said second temperature is close to said power saving setup temperature.

15. The method of claim 14, further comprising the step of making a fourth determination of whether said room temperature equals said first intermediate temperature when said power saving operation is selected.

16. The method of claim 15, further comprising the step of performing said power saving operation in response to said fourth determination.

17. The method of claim 16, further comprising the step of making a fifth determination whether said room temperature equals said second intermediate temperature after said power saving operation has been performed in response to said fourth determination.

18. The method of claim 17 further comprising the step of performing said power saving operation in response to said fifth determination.

19. The method of claim 12, further comprising the step of establishing said intermediate temperatures calculated from a formula:

$$Tg=Tns+(Tr-Tns)*C.$$

wherein Tg is one of intermediate temperatures Tns is a normal setup temperature, Tr is a room temperature, and C is a power saving coefficient.

* * * * *